United States Patent [19]
Wesel

[11] Patent Number: 5,280,525
[45] Date of Patent: Jan. 18, 1994

[54] ADAPTIVE FREQUENCY DEPENDENT COMPENSATION FOR TELECOMMUNICATIONS CHANNELS

[75] Inventor: Richard D. Wesel, Stanford, Calif.

[73] Assignee: AT&T Bell Laboratories, Murray Hill, N.J.

[21] Appl. No.: 767,305

[22] Filed: Sep. 27, 1991

[51] Int. Cl.$^5$ .................. H04M 1/00; H04M 9/00
[52] U.S. Cl. .................. 379/400; 379/406; 379/401
[58] Field of Search ............ 379/346, 394, 398, 404, 379/400, 401, 406, 409, 410; 381/98, 101, 102, 103

[56] References Cited

U.S. PATENT DOCUMENTS

| | | | |
|---|---|---|---|
| 4,468,804 | 8/1984 | Kates et al. | 381/47 |
| 4,589,131 | 5/1986 | Horvath et al. | 381/38 |
| 4,879,748 | 11/1989 | Picone et al. | 381/49 |
| 4,991,167 | 2/1991 | Petri et al. | 370/32.1 |
| 5,195,132 | 3/1993 | Bowker et al. | 379/410 |

FOREIGN PATENT DOCUMENTS

| | | | |
|---|---|---|---|
| 0304674 | 1/1989 | European Pat. Off. | H04J 1/00 |
| 0298621 | 11/1989 | European Pat. Off. | H04M 3/50 |
| 0489543 | 10/1992 | European Pat. Off. | H04M 3/40 |
| 3629596 | 5/1993 | Fed. Rep. of Germany | H04M 9/10 |
| 62-53054 | 3/1987 | Japan | 379/346 |

*Primary Examiner*—James L. Dwyer
*Assistant Examiner*—Fan Tsang
*Attorney, Agent, or Firm*—Thomas Stafford

[57] ABSTRACT

The quality of speech being transmitted in a telecommunication channel is enhanced by adaptively compensating for frequency dependent attenuation in the telecommunication channel. The frequency dependent attenuation in the telecommunication channel is dynamically determined and, then, compensated for by adaptively selecting and inserting an appropriate frequency dependent gain function in the telecommunication channel.

20 Claims, 7 Drawing Sheets

ADAPTIVE FREQUENCY DEPENDENT COMPENSATION FOR TELECOMMUNICATIONS CHANNELS

TECHNICAL FIELD

This invention relates to the improvement of speech quality in telephone communication systems.

BACKGROUND OF THE INVENTION

Recently it has been determined that significant improvement of speech quality can be obtained in a telecommunication channel by restoring attenuated signal power in a frequency range of interest of approximately 100–400 Hz. This improvement has been realized by adding a fixed "frequency dependent gain (emphasis)" function in the frequency range of interest. One such arrangement is disclosed in U.S. patent application Ser. No. 07/620,997, filed Dec. 3, 1990 now U.S. Pat. No. 5,195,132 issued Mar. 16, 1993 and assigned to the assignee of this patent application.

A problem with using the fixed frequency dependent gain function is that sometimes the frequency dependent gain function being inserted will be too large or too small to compensate for the actual frequency dependent attenuation in the frequency range of interest in the particular telecommunication channel. This is because frequency dependent attenuation will be different for different telecommunication channels in the communication system.

Another problem with the use of a fixed frequency dependent gain function arises when there is more than one occurrence of inserting such a frequency dependent gain function in the particular telecommunication channel. This so-called tandem insertion of fixed frequency dependent gain functions causes far too much frequency dependent gain to be inserted in the channel which, in turn, causes poor speech quality at a receiver.

SUMMARY OF THE INVENTION

These and other problems of employing a fixed frequency dependent gain function for compensating for frequency dependent attenuation of speech in a telecommunication channel are overcome, in accordance with the invention, by compensating for frequency dependent attenuation in the channel in a way which is adaptive. This compensation is obtained adaptively by detecting the presence of speech in the channel, dynamically determining the frequency dependent attenuation present in the channel and inserting a corresponding frequency dependent gain function in the channel.

More specifically, the frequency dependent attenuation is determined by dynamically evaluating the detected speech present in a predetermined frequency range in the channel.

In a particular embodiment of the invention, the frequency dependent attenuation is determined by detecting the presence of voiced speech and examining prescribed features of a portion of its power spectrum. Then, a frequency dependent gain function is inserted which compensates for the determined frequency dependent attenuation in the predetermined frequency range of the telecommunication channel.

In an exemplary embodiment of the invention, the frequency dependent attenuation in the predetermined frequency range is obtained by determining the logarithm of the ratio of the power at the fundamental pitch frequency of the detected voiced speech and the power at its first harmonic. The resulting value is representative of the so-called "pitch harmonic slope" of the detected voiced speech. In turn, an average of a plurality of pitch harmonic slope values is used as a control signal to select a filter having a frequency dependent gain function which compensates for the dynamically determined frequency dependent attenuation.

DETAILED DESCRIPTION

Figure 1:
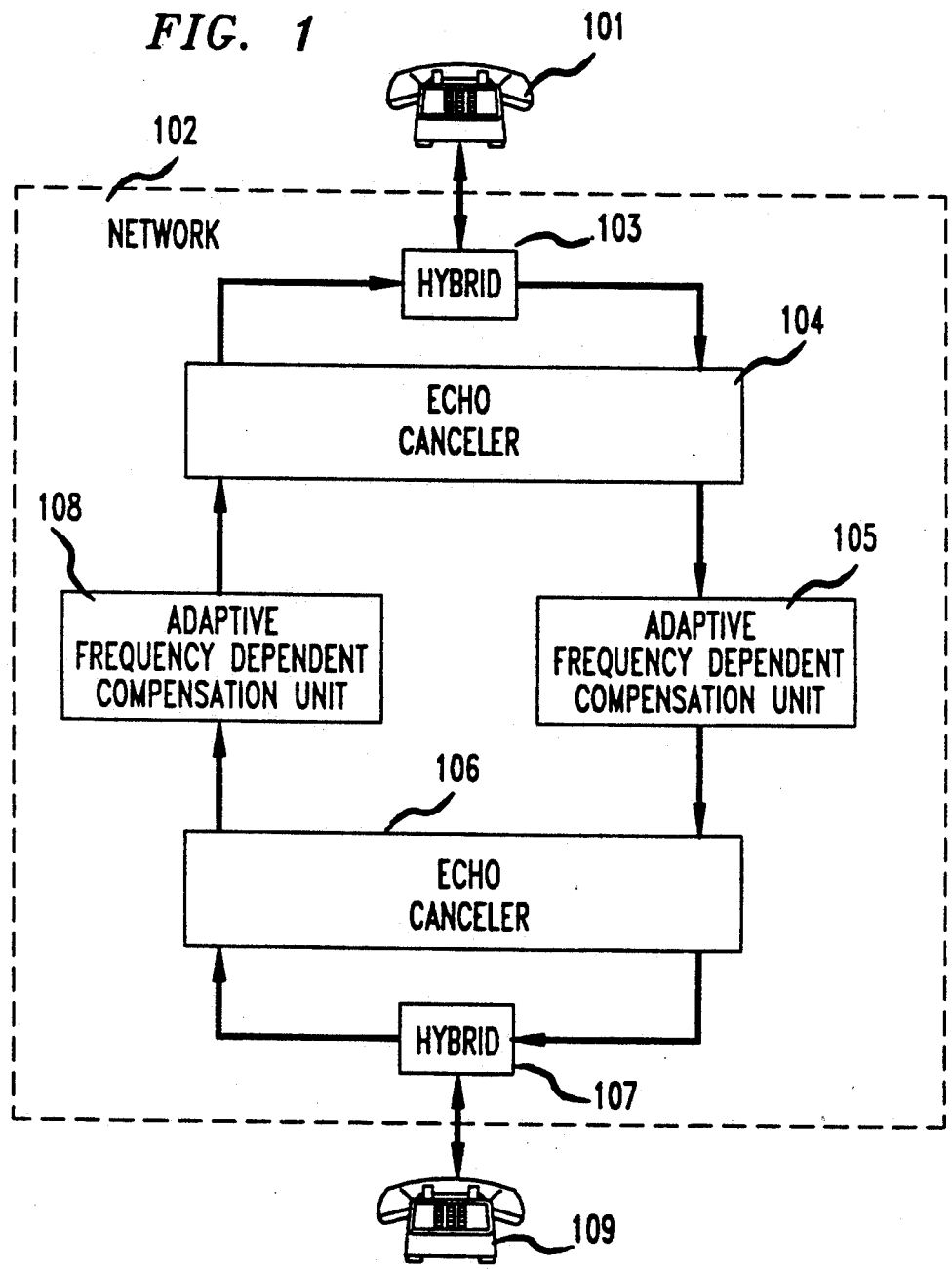
FIG. 1 shows, in simplified block diagram form, details of a communication system in which the invention may be practiced.

FIG. 1 depicts, in simplified form, a communication system in which the invention may be practiced. Accordingly, shown is first station set 101 which is connected, in known fashion, via a local central office (not shown) and possibly a toll switch (not shown) to telecommunication network 102. Network 102, in this example, includes hybrid 103 for coupling bidirectional signals between station set 101 and unidirectional outgoing and incoming transmission paths in network 102. Also included in network 102 are echo canceler 104, first adaptive frequency dependent compensation unit 105, echo canceler 106, hybrid 107 and second adaptive frequency dependent compensation unit 108. Hybrid 107 couples signals between unidirectional incoming and outgoing transmission paths in network 102 to station set 109. Again, the connection between network 102 and station set 109 may be obtained through a toll switch and a local central office, in known fashion. Compensation units 105 and 108 are included in network 102 pursuant to the invention, as described in detail herein below.

It is known that both station set 101 and station set 109 introduce frequency dependent attenuation into the communication system in a prescribed frequency range which degrades the quality of speech signals being transmitted in associated telecommunication channels. As indicated above, the prescribed frequency range is, for example, 100–400 Hz or less than 500 Hz. It is noted that the frequency dependent attenuation introduced into a telecommunication channel may vary from channel to channel because of the channel itself and because of the station set connected to the channel. Thus, an incoming channel may have a different frequency dependent attenuation than an outgoing channel.

Echo cancelers 104 and 106 are employed, in now well known fashion, to minimize so-called echo signals in the telecommunication channel. Inclusion of echo cancelers 104 and 106 is desirable, but not absolutely necessary in practicing the invention. Use of echo cancelers 104 and 106 would minimize the possibility of so-called "singing" occurring in the telecommunication channel. The singing could result from the insertion into the telecommunication channel of frequency dependent gain which is adaptively obtained via adaptive frequency dependent compensation units 105 and 108.

Figure 2:
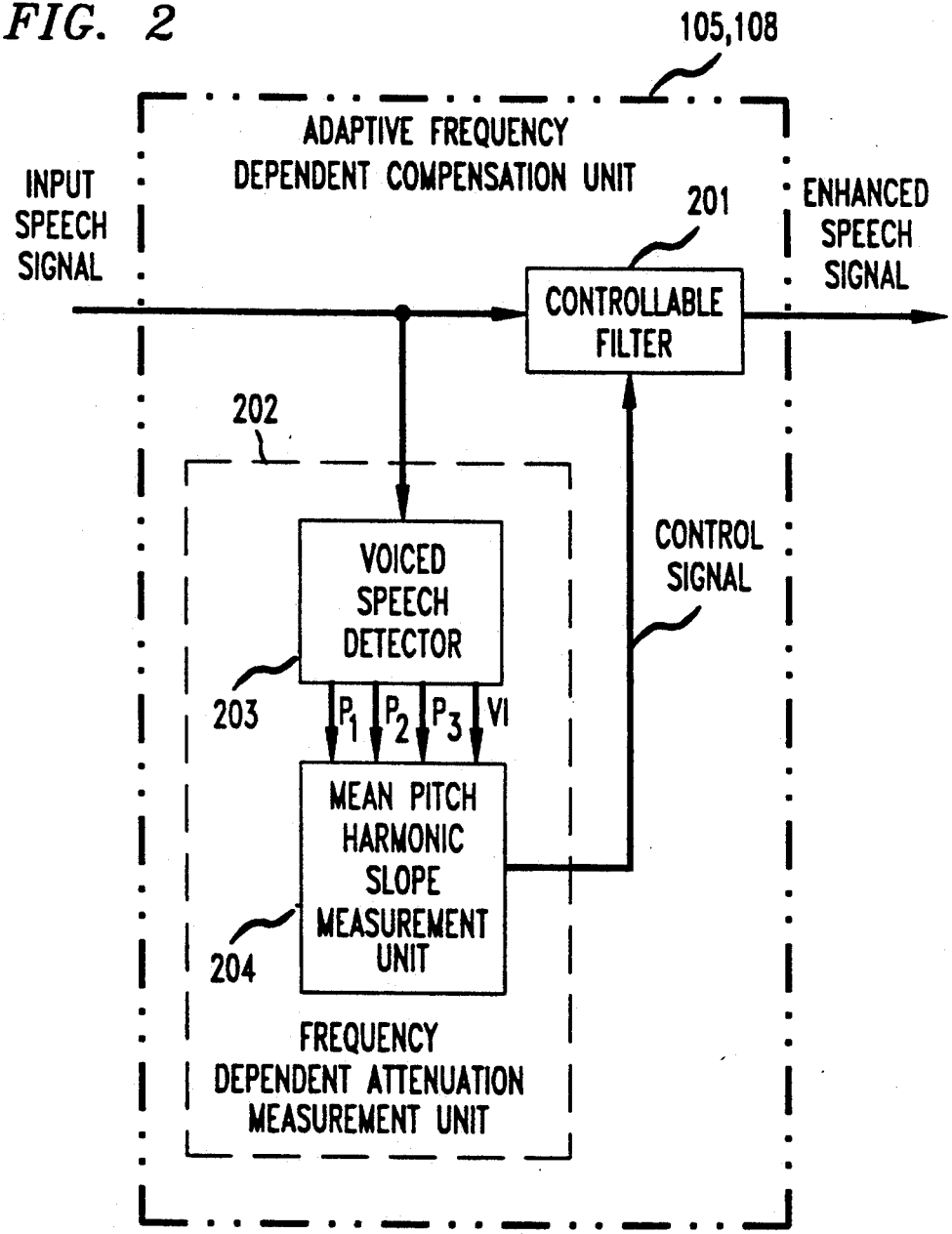
FIG. 2 shows, in simplified block diagram form, details of the adaptive frequency dependent compensation units 105 and 108 of FIG. 1.

FIG. 2 shows, in simplified block diagram form, details of adaptive frequency dependent compensation units 105 and 108. Specifically, an input speech signal in the telecommunication channel is supplied to controllable filter 201 and to frequency dependent attenuation measurement unit 202, and therein, in this example, to voiced speech detector 203. In this example, the speech signal is in digital PCM form. It will be apparent to those skilled in the art that other arrangements may be devised for obtaining a determination of the frequency dependent attenuation in the frequency range of interest, namely, 100-400 Hz, in the telecommunication channel. What is important in practicing the invention is to dynamically determine the frequency dependent attenuation in the frequency range of interest and, then, to adaptively compensate for it by selection and insertion of a corresponding frequency dependent gain function. This is achieved by frequency dependent attenuation measurement unit 202 yielding a control signal representative of the frequency dependent attenuation which is employed to select a corresponding frequency dependent gain function to be inserted in the telecommunication channel via controllable filter 201. It is again noted that different frequency dependent gain functions may be inserted by units 105 and 108. This may result because of different frequency dependent attenuation being inserted by station sets 101 and 109.

I have determined that the spectra of voiced speech utterances are significantly affected by frequency dependent attenuation in the frequency range of interest in the telecommunication channel. To this end, arrangements embodying the principles of the invention may advantageously employ the harmonically spaced pitch peaks in the spectrum of voiced speech utterances to dynamically obtain a measure of the frequency dependent attenuation in the telecommunication channel.

Specifically, voiced speech detector 203 generates an indication VI of the presence of a voiced speech spurt. This VI indication, along with the average power values $P_1$, $P_2$ and $P_3$ herein below, are supplied from voiced speech detector 203 to the mean pitch harmonic slope measurement unit 204. Unit 204 uses the average power values for an indicated speech spurt to determine the average power at the pitch frequency of the voiced speech spurt and the average power of the first harmonic of this frequency. As explained below, unit 204 uses the average power at the pitch frequency and its first harmonic to generate a control signal representative of the mean pitch harmonic slope of the detected voiced speech signal. As indicated above, the control signal is representative of the frequency dependent attenuation in the communication channel and is employed to select a compensating frequency dependent gain function in controllable filter 201.

Figure 3:
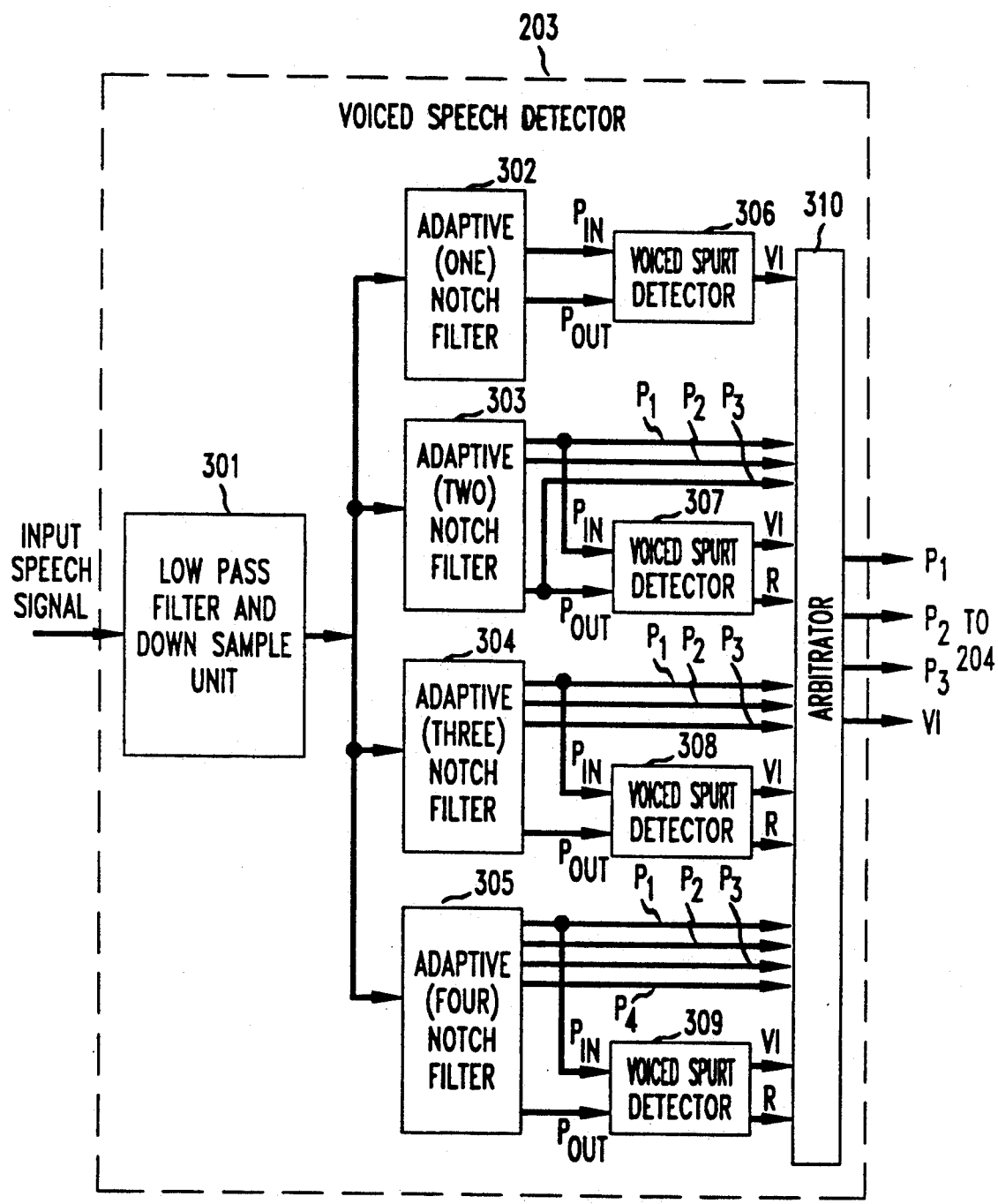
FIG. 3 depicts, in simplified block diagram form, details of voiced speech detector 203 of FIG. 2.

FIG. 3 shows, in simplified block diagram form, details of voiced speech detector 203. In particular, shown is low pass filter and down-sample unit 301 which is supplied with the PCM input speech signal. The low pass filter, in this example, greatly attenuates frequencies above 500 Hz. This filtering reduces the number of pitch harmonics likely to be present. The low pass filtered speech signal is then down—sampled, i.e., decimated, to a sampling rate of 1 kHz, in this example. The low pass filter prevents aliasing during decimation. Decimation lowers the signal processing computational requirements. Any desired low pass filter may be utilized. An equiripple finite impulse response (FIR) filter is advantageously employed in this example.

The filtered and down—sampled speech signal is supplied, in this example, to each of adaptive notch filters 302 through 305. Filter 302 has one notch, filter 303 has two notches, filter 304 has three notches and filter 305 has four notches. The notches of filters 303 through 305 are harmonically locked and the multiple notch filters are obtained by cascading single notch filters. In this example, adaptive notched filters 302 through 305 are operating at a 1 kHz rate. Notch positions of filters 302 through 305 are adapted using a gradient algorithm.

Figure 4:
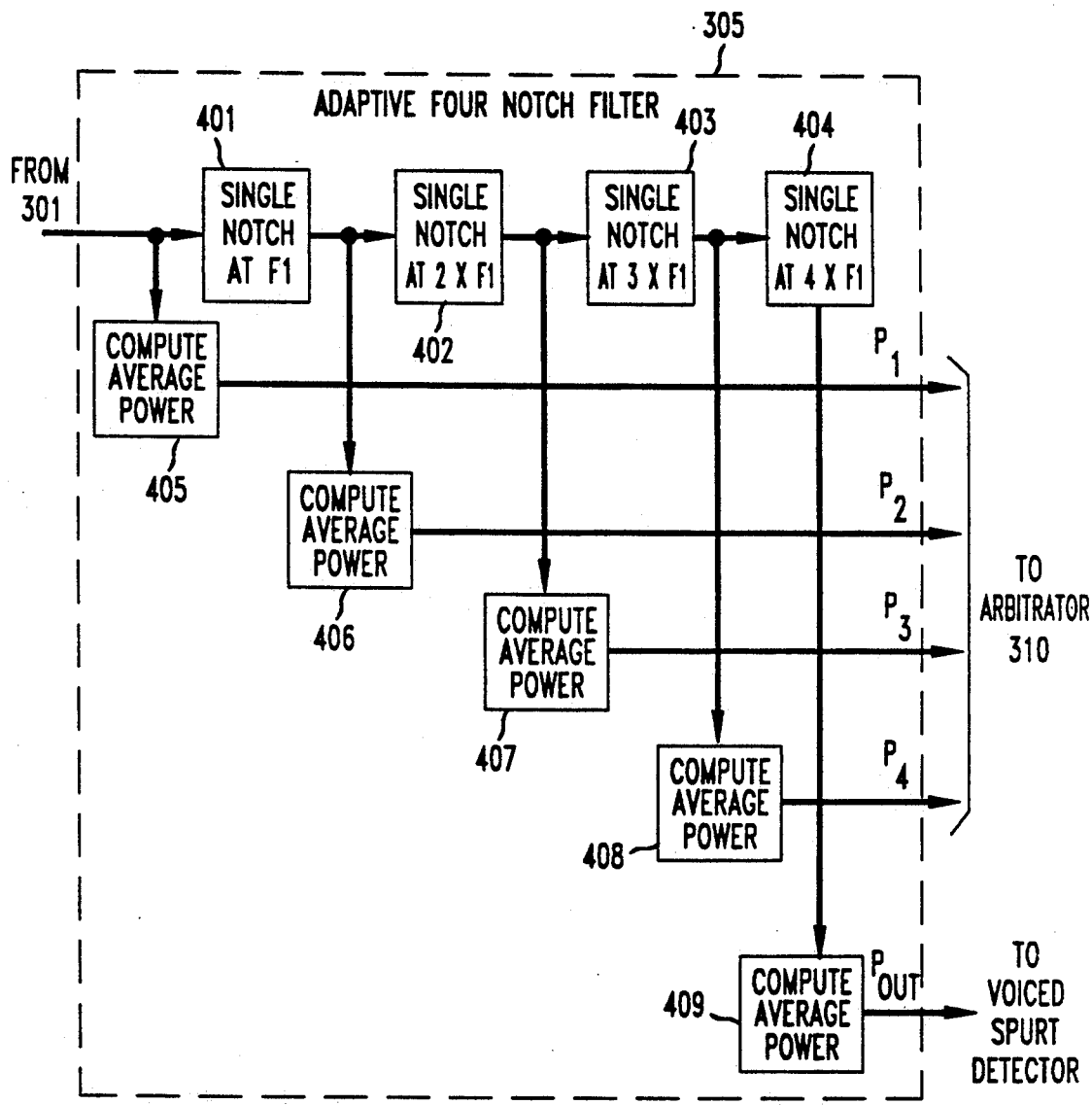
FIG. 4 illustrates, in simplified block diagram form, details of adaptive notch filter 305 of FIG. 3.

Before continuing with the description of FIG. 3 attention is directed to FIG. 4 which shows, in simplified form, details of adaptive four notch filter 305. Accordingly, shown are single notch filters 401 through 404 connected in cascade and each having a single notch at frequencies F1, $2 \times F1$, $3 \times F1$ and $4 \times F1$, respectively. The average powers $P_1$, $P_2$, $P_3$ and $P_4$ into filters 401, 402, 403 and 404 are obtained by compute average power units 405, 406, 407 and 408, respectively. The average power out ($P_{OUT}$) of filter 305 is obtained via compute average power unit 409 from the output of single notch filter 404. The average power values $P_1$, $P_2$, $P_3$ and $P_4$ from filter 305 are supplied to arbitrator 310 (FIG. 3). The average powers are obtained over a predetermined interval which corresponds, in this example, to approximately 32 msec of speech, i.e., over thirty two (32) 1 Khz samples. It should be noted that from the details of filter 305 shown in FIG. 4, it will be apparent how to implement adaptive notch filters 302 through 304.

For each of adaptive notch filters 302 through 305, the notch frequency F1 is constrained to a different range of values depending on the number of notches included in the particular filter. However, the notch frequency F1 cannot be so low in frequency that it has harmonic below 450 Hz without a corresponding notch. Additionally, the notch frequency F1 cannot be so high that the highest frequency notch included in the filter is above 500 Hz.

Continuing with the description of FIG. 3, the average power values $P_1$, $P_2$, $P_3$ and sometimes $P_4$ from adaptive notch filters 303, 304 and 305 are also supplied to arbitrator 310. Average power into ($P_{IN}$) and average power out of ($P_{OUT}$) each of adaptive notch filters 302 through 305 are supplied to each of associated voiced spurt detectors 306 through 309, respectively.

Figure 5:
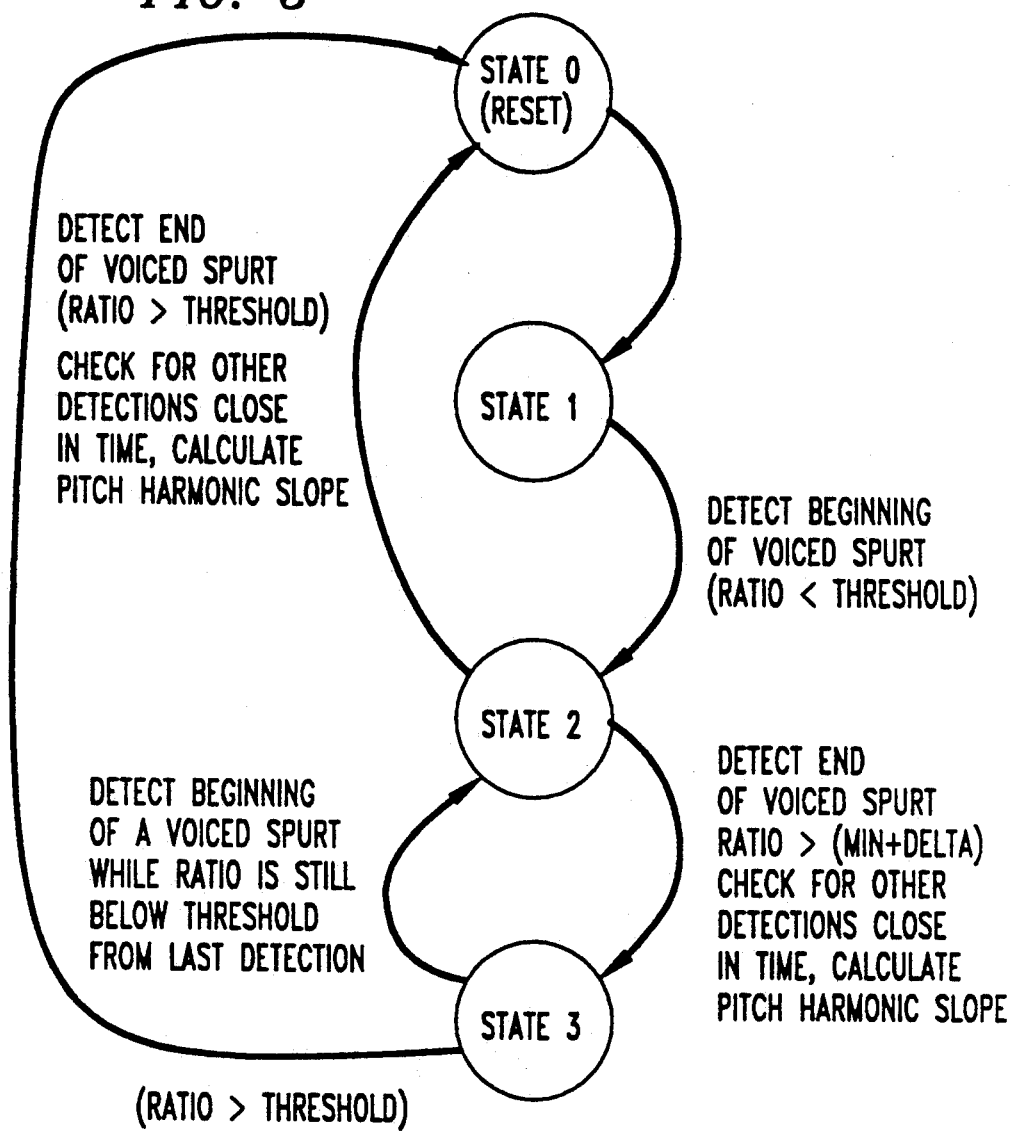
FIG. 5 shows a state diagram illustrating operation of the voiced spurt detectors of FIG. 3.

Each of voiced spurt detectors 306 through 309 is employed to detect the presence of a voiced speech spurt in the input PCM speech signal. Any number of known voiced speech spurt detection arrangements could possibly be used for this purpose. Operation of each of voiced spurt detectors 306 through 310 is shown in the state diagram of FIG. 5. Initially, the particular voiced speech spurt detector is in STATE 0, where it resets its counters (not shown) and initializes to STATE 1. In STATE 1, a ratio (R) is generated which is the corresponding notch filter average output power ($P_{OUT}$) divided by the corresponding notch filter average input power ($P_{IN}$), namely, $R = P_{OUT}/P_{IN}$. Whenever a voiced speech spurt is present, most of the voiced speech signal power will be located at the harmonic frequencies being notched out. This causes ratio R to be small in value when a voiced speech spurt is present. STATE 2 (FIG. 5) is entered when a predetermined number of consecutive values of ratio R are below a predetermined threshold value. In this example, when four consecutive values of ratio R are below the threshold value, STATE 2 is entered.

Whenever STATE 2 is entered, a voiced speech spurt will eventually be identified as being present. Arbitration in arbitrator 310 (FIG. 3) then decides whether a valid voiced speech spurt was detected by a particular one of voiced spurt detectors 306 through 309. A voiced speech spurt detection is identified whenever it is deemed that the voiced spurt has ended. This can occur in two ways. The simplest way an end of voiced spurt detection can occur is that the value of ratio R rises above the predetermined threshold value. When this occurs, the voiced spurt detector returns to STATE 0, where it is initialized for the next voiced spurt detection. An end of voiced spurt detection can also occur if the value of the ratio R does not rise above the threshold value. Specifically, if the value of ratio R has risen some significant amount (DELTA) above its minimum (MIN) value, an end of voiced spurt detection is declared and the voiced spurt detector enters STATE 3. The voiced spurt detector cannot return to STATE 0 because another voiced spurt detection would be declared immediately since the value of ratio R is still below the threshold value. In STATE 3, it is determined whether or not another voiced spurt detection should be declared even though the value of ratio R has not exceeded the threshold value since the previous detection. In this example, this determination is achieved by keeping track of the maximum value of ratio R since the last voiced spurt detection. If, while in STATE 3, the value of ratio R drops by a prescribed value below the maximum value, STATE 2 is entered. Again, STATE 2 ensures that a voiced spurt detection will eventually be declared. If the value of ratio R rises above the threshold value, STATE 0 is entered. It has been observed that during extended voiced speech spurts, STATE 3 allows multiple valid voiced spurt detections to be declared, which yield pitch harmonic slope values that accurately represent the frequency dependent attenuation in the frequency range of interest.

Continuing with the description of FIG. 3, each of voiced spurt detectors 306 through 309 supplies a voiced speech indication VI to arbitrator 310 when voiced spurts are detected. Voiced spurt detectors 307 through 309 also supply a value for ratio R to arbitrator 310.

When a voiced spurt detection is declared, arbitrator 310 (FIG. 3) is employed to select the adaptive notch filter, i.e., 303, 304 or 305, which will supply the average power values $P_1$, $P_2$ and $P_3$ that will be used in obtaining the pitch harmonic slope measurement. To this end, arbitrator 310 responds to a voiced spurt indication VI from any of voiced spurt detectors 306 through 309. When such a voiced spurt indication is identified, the time at which a previous voiced spurt detection occurred is checked. If the most recent previous voiced spurt detection has occurred within a prescribed interval, in this example 100 msec, of the current voiced spurt detection, only one of these voiced spurt detections is declared valid and used to obtain the pitch harmonic slope measurement. If both voiced spurt detections resulted from the same one of adaptive filters 303 through 305, then the voiced detection resulting from the lowest value of ratio R is chosen. If the voiced spurt detections are from two of adaptive notch filters 303 through 305, the voiced spurt detection resulting from the one of filters 303 through 305 having the fewest notches is normally selected with one exception. If the contending voiced spurt detections result from adaptive notch filter 303 having two notches and from adaptive notch filter 305 having four notches, the power removed by the first notch of filter 303, i.e., $P_1-P_2$ of filter 303, is compared with the power removed by the third notch of filter 305, i.e., $P_3-P_4$ of filter 305. Then, the voiced spurt detection resulting from the filter having the notch that removed the most power in the above comparison is selected for the pitch harmonic slope measurement. Whenever the voiced spurt detection resulting from adaptive notch filter 302 is chosen in arbitration, no voiced spurt detection is declared by arbitrator 310 since at least two power peaks are needed to obtain the pitch harmonic slope measurement. In this manner, the combination of adaptive notch filter 302 and voiced spurt detector 306 function as an inhibitor that prevents false voiced spurt detections resulting from adaptive notch filters 303 through 305 and their corresponding voiced spurt detectors 307 through 309, respectively. The average power values $P_1$, $P_2$ and $P_3$ and the voiced spurt indication VI from the selected one of adaptive notch filters 303 through 305 and its corresponding voiced spurt detector 307 through 309 are supplied by arbitrator 310 to mean pitch harmonic slope measurement unit 204 (FIG. 2).

Figure 6:
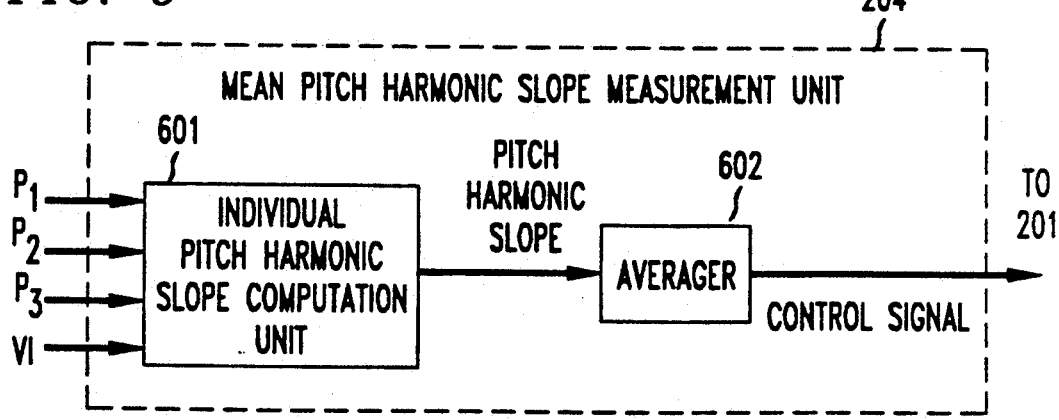
FIG. 6 depicts, in simplified block diagram form, details of mean pitch harmonic slope measurement unit 204 of FIG. 2.

FIG. 6 depicts, in simplified block form, details of mean pitch harmonic slope measurement unit 204. Accordingly, shown are individual pitch harmonic slope computation unit 601 and averager 602. The average power values $P_1$, $P_2$ and $P_3$ and the voiced spurt indication VI are supplied from arbitrator 310 (FIG. 3) to individual pitch harmonic slope computation unit 601. As indicated above, I have determined that the so-called pitch harmonic slope of the pitch peaks of the spectrum of voiced speech utterances can advantageously be employed to dynamically obtain a measure of frequency dependent attenuation in a telecommunication channel.

Figure 7:
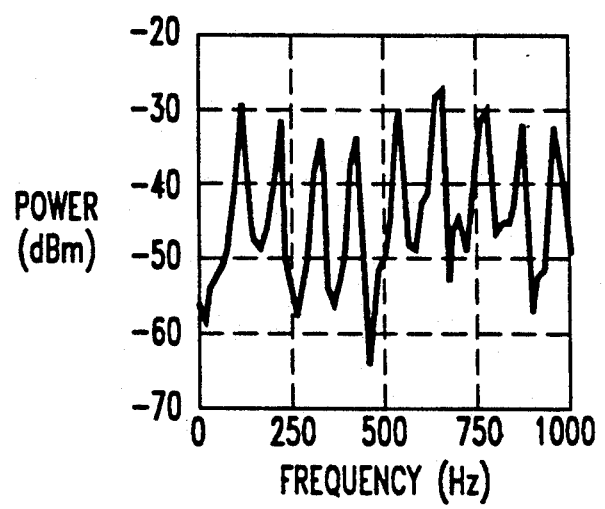
FIG. 7 is a graphic representation of a portion of a spectrum of voiced speech useful in describing operation of the invention.
Figure 8:
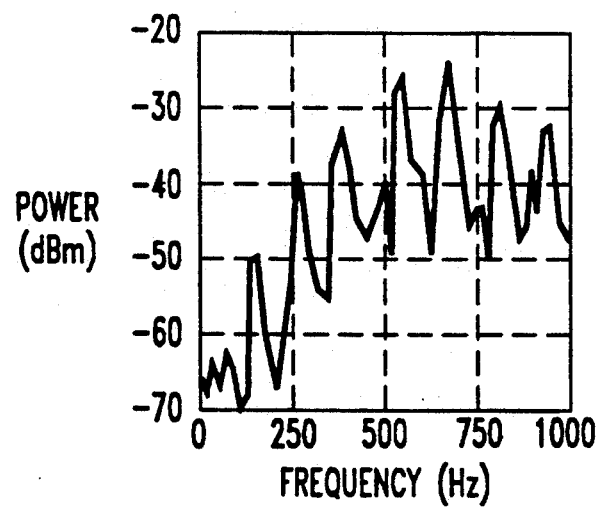
FIG. 8 is another graphic representation of a portion of a spectrum of voiced speech also useful in describing operation of the invention.

Briefly, FIG. 7 shows a portion of the spectrum of a voiced speech utterance passed through a telecommunication channel with little frequency dependent attenuation. FIG. 8 shows a portion of the spectrum of a similar voiced speech utterance passed through a telecommunication channel having significant frequency dependent attenuation. The spectra shown in FIGS. 7 and 8, show harmonically spaced peaks of power which indicate they are spectra of voiced speech. Note how the attenuation has affected the relationship between the first two power peaks. The envelope of pitch harmonic power peaks will be different for different voiced speech utterances and will be different from speaker to speaker for the same utterance. Although all these variances are important, regarding the pitch harmonic slope of the voiced speech utterance, their effect is small compared to the effect of the telecommunication channel on the "average" pitch harmonic slope.

Individual pitch harmonic slope computation unit 601 (FIG. 6) obtains a value for the individual pitch harmonic slope (PHS) for detected voiced spurts in accordance with $$PHS = 10\log_{10}\frac{P_3 - P_2}{P_2 - P_1}.$$

Averager 602 then averages the PHS values obtained over a prescribed number of computations to obtain a mean pitch harmonic slope value. This mean pitch harmonic slope value is supplied as the control signal output from frequency dependent attenuation measurement unit 202 (FIG. 2) to controllable filter 201.

Figure 9:
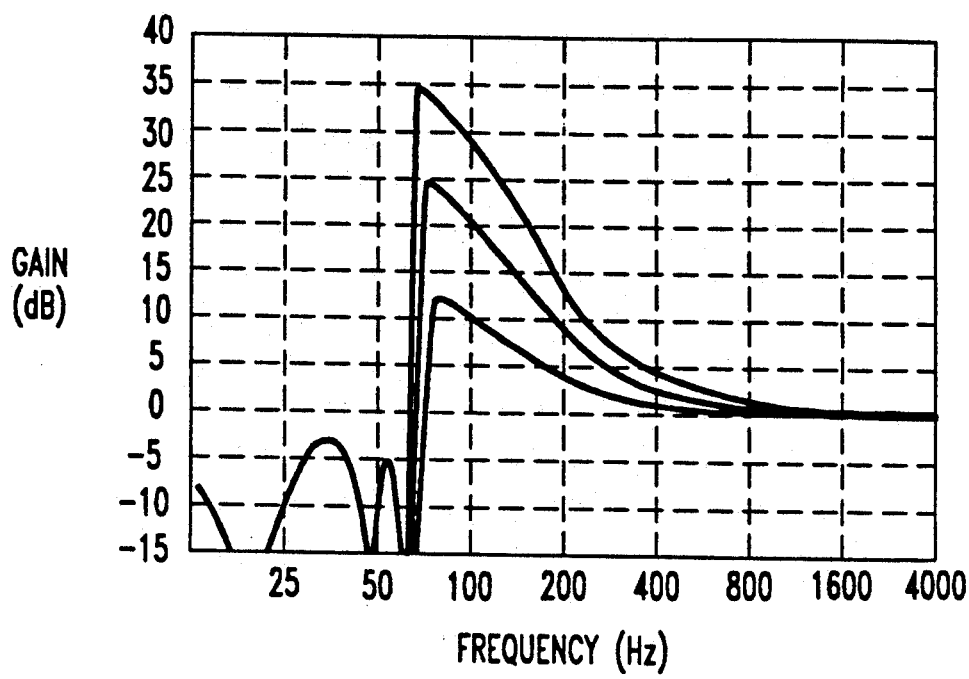
FIG. 9 graphically illustrates a plurality of frequency dependent gain functions useful in practicing the invention.

Controllable filter 201 of FIG. 2 is employed to controllably insert a frequency dependent gain function in the telecommunication channel thereby compensating for the dynamically determined frequency dependent attenuation in the telecommunication channel represented by the control signal. To this end, controllable filter 201 is responsive to the supplied control signal to select a corresponding frequency dependent filter function for compensating for the frequency dependent attenuation in the channel. A number of possible filter arrangements can equally be employed to obtain the desired frequency dependent gain functions. For example, one filter arrangement employs a plurality of pole-zero pairs cascaded with a high pass filter. In a specific embodiment, four such pole-zero pairs are employed. The poles in the pole-zero pairs are fixed while the zeros are adjustable in response to the control signal to obtain the desired frequency dependent gain function. In a specific example, the pole-zero pairs are located at 50 Hz. In this arrangement, the resulting frequency dependent gain function is continuously variable in response to the value of the control signal, i.e., mean pitch harmonic slope value. FIG. 9 shows frequency dependent gain functions for controllable filter 201 generated by this arrangement for mean pitch harmonic slope values of 5, 10 and 15 dB.

Figure 10:
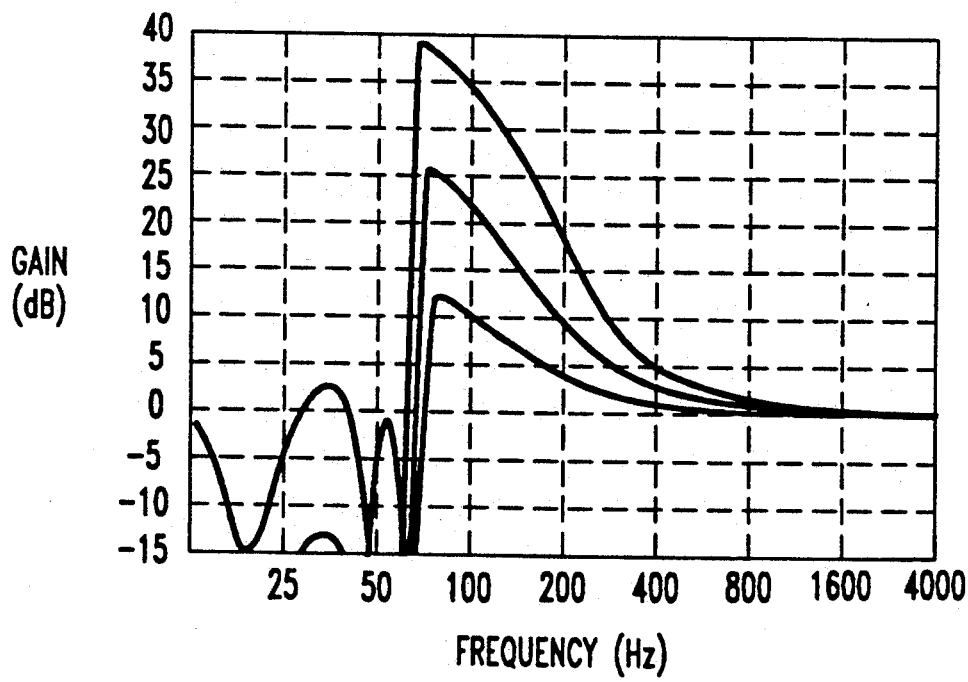
FIG. 10 graphically illustrates another plurality of frequency dependent gain functions also useful in practicing the invention.

In another possible arrangement, a filter is employed with a relatively small frequency dependent gain function. This filter will be referred to as the "component filter." In the example of this method shown in FIG. 10, the so-called "component filter" had a slope of 1 dB per octave between 90 and 100 Hz. The desired frequency dependent gain function is obtained by cascading a high pass filter with however many instances of the component filter are required. With this arrangement, the desired frequency gain function can only be varied discretely. Thus, the mean pitch harmonic slope values must be quantized. FIG. 10 shows frequency dependent gain functions generated by this arrangement for mean pitch harmonic slope values of 5, 10 and 15 dB.

The above-described arrangements are, of course, merely illustrative of the application of the principles of the invention. Other arrangements may be devised by those skilled in the art without departing from the spirit or scope of the invention. Specifically, it will be appreciated that it may be advantageous in certain applications to detect other than voiced speech in determining the attenuation in the telecommunication channel. Additionally, although this embodiment of the invention is described as being implemented in the network adjacent to echo cancelers, it will be apparent to those skilled in the art that my unique adaptive frequency dependent attenuation compensation invention may be equally employed at other locations in a telecommunication channel. For example, an embodiment of the invention could be included in individual channel interface units in a digital switch, individual station sets or the like.

I claim:

1. A method for enhancing speech signals in a telecommunication channel comprising the steps of:
   detecting the presence of speech in the telecommunication channel;
   dynamically determining a measure of frequency dependent attenuation of said speech in a predetermined frequency range of the telecommunication channel by obtaining measures of prescribed power values in the spectrum of said detected speech signal and utilizing the measures of said prescribed power values to obtain said measure of said frequency dependent attenuation; and
   in response to said measure of frequency dependent attenuation, controllably inserting a frequency dependent gain function in the telecommunication channel to compensate for said determined frequency dependent attenuation.

2. The method as defined in claim 1 wherein said step of detecting includes detecting the presence of a voiced speech signal in the telecommunication channel and wherein said measures of prescribed power values are of said detected voiced speech signal.

3. The method as defined in claim 2 wherein said step of controllably inserting includes obtaining a frequency dependent gain function in response to said measure of frequency dependent attenuation and inserting said obtained frequency dependent gain function in the telecommunication channel to compensate for said determined frequency dependent attenuation.

4. The method as defined in claim 3 wherein said obtained prescribed power values of the detected voiced speech signal spectrum are at the voiced speech signal fundamental pitch frequency and at least one predetermined harmonic of said fundamental pitch frequency.

5. The method as defined in claim 4 wherein said measure of frequency dependent attenuation is determined in accordance with a prescribed relationship of said measures of prescribed power values at said fundamental pitch frequency and said at least one predetermined harmonic of said fundamental pitch frequency.

6. The method as defined in claim 5 wherein said at least one predetermined harmonic comprises the first harmonic of said fundamental pitch frequency.

7. The method as defined in claim 6 wherein said prescribed relationship is $$PHS = 10\log_{10}\frac{P_3 - P_2}{P_2 - P_1},$$

where PHS is a value representative of the frequency dependent attenuation, $P_2-P_1$ is representative of the power at the fundamental pitch frequency of said detected voiced speech signal, $P_3-P_2$ is representative of the power at the first harmonic of said fundamental pitch frequency of said detected voiced speech signal, $P_1$ is the average power in said predetermined frequency range, $P_2$ is the average power in said predetermined frequency range minus the power at a prescribed first frequency ($F_1$), and $P_3$ is the average power in said predetermined frequency range minus the power at said prescribed first frequency ($F_1$) and minus the power at a prescribed second frequency ($2F_1$).

8. The method as defined in claim 7 wherein a predetermined number of said measures of said PHS values are averaged to obtain a mean value of said frequency dependent attenuation.

9. The method as defined in claim 8 wherein said predetermined frequency range in the telecommunication channel is approximately 100 to 400 Hz.

10. The method as defined in claim 8 wherein said predetermined frequency range in the telecommunication channel is below approximately 500 Hz.

11. A method for use in a telecommunication system adapted for communicating speech signals between station sets, the station sets each causing frequency dependent attenuation to be inserted into an outgoing telecommunication channel therefrom to enhance the speech signals communicated in the outgoing telecommunication channel for each of the station sets, the method comprising the steps of:

detecting the presence of speech in the telecommunication channel;
 dynamically determining a measure of frequency dependent attenuation of said speech in a predetermined frequency range of the telecommunication channel by obtaining measures of prescribed power values in the spectrum of said detected speech signal and utilizing the measures of said prescribed power values to obtain said measure of said frequency dependent attenuation; and
 in response to said measure of frequency dependent attenuation, controllably inserting a frequency dependent gain function in the telecommunication channel to compensate for said determined frequency dependent attenuation.

12. The method as defined in claim 11 wherein said step of detecting includes detecting the presence of a voiced speech signal in the telecommunication channel and wherein said measures of prescribed power values are of said detected voiced speech signal.

13. The method as defined in claim 12 wherein said step of controllably inserting includes obtaining a frequency dependent gain function in response to said measure of frequency dependent attenuation and inserting said obtained frequency dependent gain function in the telecommunication channel to compensate for said determined frequency dependent attenuation.

14. The method as defined in claim 13 wherein said obtained prescribed power values of the detected voiced speech signal spectrum are at the voiced speech signal fundamental pitch frequency and at least one predetermined harmonic of said fundamental pitch frequency.

15. The method as defined in claim 15 wherein said measure of frequency dependent attenuation is determined in accordance with a prescribed relationship of said measures of said power values at said fundamental pitch frequency and said at least one predetermined harmonic of said fundamental pitch frequency.

16. The method as defined in claim 15 wherein said at least one predetermined harmonic comprises the first harmonic of said fundamental pitch frequency.

17. The method as defined in claim 8 wherein said prescribed relationship is $$PHS = 10\log_{10}\frac{P_3 - P_2}{P_2 - P_1},$$

where PHS is a value representative of the frequency dependent attenuation, $P_2-P_1$ is representative of the power at the fundamental pitch frequency of said detected voiced speech signal, $P_3-P_2$ is representative of the power at the first harmonic of said fundamental pitch frequency of said detected voiced speech signal, $P_1$ is the average power in said predetermined frequency range, $P_2$ is the average power in said predetermined frequency range minus the power at a prescribed first frequency ($F_1$), and $P_3$ is the average power in said predetermined frequency range minus the power at said prescribed first frequency ($F_1$) and minus the power at a prescribed second frequency ($2F_1$).

18. The method as defined in claim 17 wherein a predetermined number of said measures of said PHS values are averaged to obtain a mean value of said frequency dependent attenuation.

19. The method as defined in claim 18 wherein said predetermined frequency range in the telecommunication channel is approximately 100 to 400 Hz.

20. The method as defined in claim 18 wherein said predetermined frequency range in the telecommunication channel is below approximately 500 Hz.

* * * * *